United States Patent
Boyer et al.

(10) Patent No.: US 8,463,888 B1
(45) Date of Patent: Jun. 11, 2013

(54) METHODS AND SYSTEMS FOR MANAGING AUTOMATED IDENTIFICATION TECHNOLOGIES INFORMATION

(75) Inventors: Mark James Boyer, Placentia, CA (US); Vivienne S. Janssen, Issaquah, WA (US)

(73) Assignee: The Boeing Company, Chicago, IL (US)

(*) Notice: Subject to any disclaimer, the term of this patent is extended or adjusted under 35 U.S.C. 154(b) by 309 days.

(21) Appl. No.: 12/961,119

(22) Filed: Dec. 6, 2010

(51) Int. Cl.
G06F 15/173 (2006.01)

(52) U.S. Cl.
USPC ............ 709/223; 709/203; 709/217; 235/375

(58) Field of Classification Search
USPC .......... 709/223, 224, 203, 217, 219; 235/375, 235/385, 492; 340/539.13, 572.1, 825.49
See application file for complete search history.

(56) References Cited

U.S. PATENT DOCUMENTS

| | | | |
|---|---|---|---|
| 6,509,828 B2 | 1/2003 | Bolavage et al. | |
| 6,738,628 B1* | 5/2004 | McCall et al. | 455/456.1 |
| 7,151,453 B2 | 12/2006 | Ebert | |
| 7,165,722 B2* | 1/2007 | Shafer et al. | 235/385 |
| 7,181,731 B2 | 2/2007 | Pace et al. | |
| 7,204,409 B2* | 4/2007 | Kumar et al. | 235/375 |
| 7,205,897 B2 | 4/2007 | Lin | |
| 7,323,991 B1* | 1/2008 | Eckert et al. | 340/572.1 |
| 7,378,969 B2 | 5/2008 | Chan et al. | |
| 7,389,921 B2 | 6/2008 | Lin et al. | |
| 7,410,096 B2 | 8/2008 | Ozer | |
| 7,482,931 B2* | 1/2009 | Lin | 340/572.1 |
| 7,522,050 B2 | 4/2009 | Le | |
| 7,685,183 B2 | 3/2010 | Pace et al. | |
| 7,725,577 B2 | 5/2010 | Nochta et al. | |
| 7,737,857 B2 | 6/2010 | Ebert et al. | |
| 7,752,214 B2 | 7/2010 | Pizzorni et al. | |
| 7,762,459 B2 | 7/2010 | Haller | |
| 8,026,814 B1* | 9/2011 | Heinze et al. | 340/572.1 |
| 2004/0082296 A1* | 4/2004 | Twitchell, Jr. | 455/41.2 |
| 2004/0169589 A1* | 9/2004 | Lea et al. | 340/825.49 |
| 2004/0181467 A1* | 9/2004 | Raiyani et al. | 705/28 |
| 2005/0012613 A1* | 1/2005 | Eckstein et al. | 340/539.13 |
| 2005/0092825 A1* | 5/2005 | Cox et al. | 235/375 |
| 2005/0145688 A1* | 7/2005 | Milenkovic et al. | 235/375 |
| 2006/0049249 A1* | 3/2006 | Sullivan | 235/385 |
| 2006/0145815 A1* | 7/2006 | Lanzieri et al. | 340/10.2 |
| 2007/0133609 A1* | 6/2007 | Moore et al. | 370/484 |

(Continued)

OTHER PUBLICATIONS

US 7,801,983, 09/2010, Bornhoevd et al. (withdrawn)

*Primary Examiner* — Lashonda Jacobs
(74) *Attorney, Agent, or Firm* — Armstrong Teasdale LLP

(57) ABSTRACT

Computer-readable storage media and methods are described in relation to management, control, and distribution of automated identification technology (AIT) information and data associated with sensors and tags utilized for asset identification and tracking. The method includes generating a gateway for at least one of read and write access to deployed identification sensors and tags associated with a set of assets, the sensors and tags incorporating a plurality of disparate native solution formats, providing data storage and management with hierarchical functionality in a common data format for information passing through the generated gateway, the information related to the assets as provided by the deployed identification sensors and tags, executing a service framework for data delivery to and from the deployed sensors and tags via a publish and subscribe middleware service layer that provides access to the gateway through a common middleware interface, and providing a user interface through which commands to the common middleware interface are generated.

21 Claims, 11 Drawing Sheets

U.S. PATENT DOCUMENTS

| | | | |
|---|---|---|---|
| 2007/0260470 A1* | 11/2007 | Bornhoevd et al. | 705/1 |
| 2007/0268138 A1* | 11/2007 | Chung et al. | 340/572.1 |
| 2007/0285245 A1* | 12/2007 | Djuric et al. | 340/572.1 |
| 2007/0290791 A1* | 12/2007 | Batra | 340/5.31 |
| 2009/0037899 A1* | 2/2009 | Dharap et al. | 717/173 |
| 2009/0327102 A1* | 12/2009 | Maniar et al. | 705/28 |
| 2010/0141447 A1* | 6/2010 | Neuwirth | 340/572.1 |
| 2010/0277283 A1* | 11/2010 | Burkart et al. | 340/10.3 |
| 2010/0277285 A1* | 11/2010 | Anderson et al. | 340/10.4 |
| 2011/0035491 A1* | 2/2011 | Gelvin et al. | 709/224 |
| 2011/0035672 A1* | 2/2011 | Gregersen et al. | 715/735 |
| 2011/0302264 A1* | 12/2011 | Lawrence et al. | 709/207 |
| 2012/0306616 A1* | 12/2012 | Griffin | 340/5.52 |
| 2012/0310854 A1* | 12/2012 | Cova et al. | 705/333 |

* cited by examiner

METHODS AND SYSTEMS FOR MANAGING AUTOMATED IDENTIFICATION TECHNOLOGIES INFORMATION

BACKGROUND

The field of the disclosure relates generally to automated identification technologies, and more specifically, to methods and systems for managing the information created through various automated identification technology types.

Automated identification technologies (AIT) generally refers to, in combination of, such known identification and location technologies such as radio frequency identification (RFID), both passive and active, unique identification (UID) tags, ultra-wideband (UWB) radio frequency identification systems, Wi-Fi, and global positioning systems (GPS) to name a few. Systems that incorporate one or more AIT's may often be referred to as a hybrid AIT system or solution.

Across large enterprises, such as an aircraft manufacturer, multiple solutions of these AITs are incorporated, for example, for the tracking of various component parts, replaceable units, tooling, etc. that go into the fabrication and support of a modern platform, such as an aircraft. However, these multiple AITs are generally disparate, and disparate and distributed management of differing RFID solutions across an enterprise leads to inefficiencies, as well as the loss of information that could have been shared across multiple divisions within the enterprise.

As mentioned, the various divisions within an enterprise often do not have ubiquitous visibility of all AIT tracked items in the manufacturing, testing, and support processes. In addition to being inefficient, not having ubiquitous visibility is also ineffective as it does not allow for an integrated approach for data collection, metrics reporting, information security, systems integration and scalability in a distributed environment.

BRIEF DESCRIPTION

In one aspect, one or more computer-readable storage media having computer-executable instructions embodied thereon are provided, wherein when executed by at least one processor, the computer-executable instructions cause the at least one processor to generate a gateway for at least one of read and write access to deployed identification sensors and tags associated with a set of assets, the sensors and tags incorporating a plurality of disparate native solution formats, provide data storage and management with hierarchical functionality in a common data format for information passing through the generated gateway, the information related to the assets as provided by the deployed identification sensors and tags, execute a service framework for data delivery to and from the deployed sensors and tags via a publish and subscribe middleware service layer that provides access to the gateway through a common middleware interface, and provide a user interface through which commands to the common middleware interface are generated.

In another aspect, a method for computer-based method for management, control, and distribution of automated identification technology (AIT) information and data associated with sensors and tags utilized for asset identification and tracking is provided. The method includes generating, using a processing device, a gateway for at least one of read and write access to deployed sensors and tags associated with a set of assets, the sensors and tags incorporating a plurality of disparate native solution formats, providing data storage and management with hierarchical functionality in a common data format for information passing through the generated gateway, the information related to the assets as provided by the deployed identification sensors and tags, executing a service framework for data delivery to and from the deployed sensors and tags via a publish and subscribe middleware service layer that provides access to the gateway through a common middleware interface, and providing a user interface through which commands relating to the access of the stored data and writing of data to the deployed sensors through the common middleware interface are generated.

In still another aspect, one or more computer-readable storage media having computer-executable instructions embodied thereon are provided, wherein when executed by at least one processor, the computer-executable instructions cause at least one processor to transform data from diverse automated identification components, delivered in multiple native solution formats, to a common data structure format within an Extensible Markup Language (XML) framework, associate the transformed automated identification component data with specific locations to generate spatial location data for the assets associated with respective automated identification components, and providing access to the transformed and associated automated identification component data via a user interface.

In yet another aspect, an asset tracking system is provided. The asset tracking system includes a first computer system associated with a first location and configured to transmit, using a first data format, data relating to a first identification device associated with a first physical asset when a presence of the first identification device is detected by the first computer system, the first data format associated with the first identification device, a second computer system associated with a second location and configured to transmit, using a second data format, data relating to a second identification device associated with a second physical asset when a presence of the second identification device is detected by the second computer system, the second data format associated with the second identification device, and an asset tracking gateway device coupled in communication with the first computer system and the second computer system. The asset tracking gateway device is configured to receive the data relating to the first and second identification devices in the respective first and second data formats, convert the data in the first and second data formats to a common data format, store a first asset identification event in association with the data relating to the first identification device in the common data format, the first asset identification event including a location and a time at which the presence of the asset was detected by the first computer system, and store a second asset identification event in association with the data relating to the second identification device in the common data format, the second asset identification event including a location and a time at which the presence of the asset was detected by the second computer system.

The features, functions, and advantages that have been discussed can be achieved independently in various embodiments or may be combined in yet other embodiments further details of which can be seen with reference to the following description and drawings.

DETAILED DESCRIPTION

The embodiments described herein relate to Automated Identification Technologies (AITs), and particularly to an AIT information management system and architecture framework that identifies the specific layers of functionality to manage, disseminate, and process all types of AIT information and data for AITs such as RFID and UID. The AIT information management system further provides for single source visibility and solution management for disparate AIT solutions, including RFID (radio frequency identification), both passive and active, UID (unique identification) tags, ultra-wideband (UWB) wireless, Wi-Fi, and GPS (global positioning system).

Figure 1:
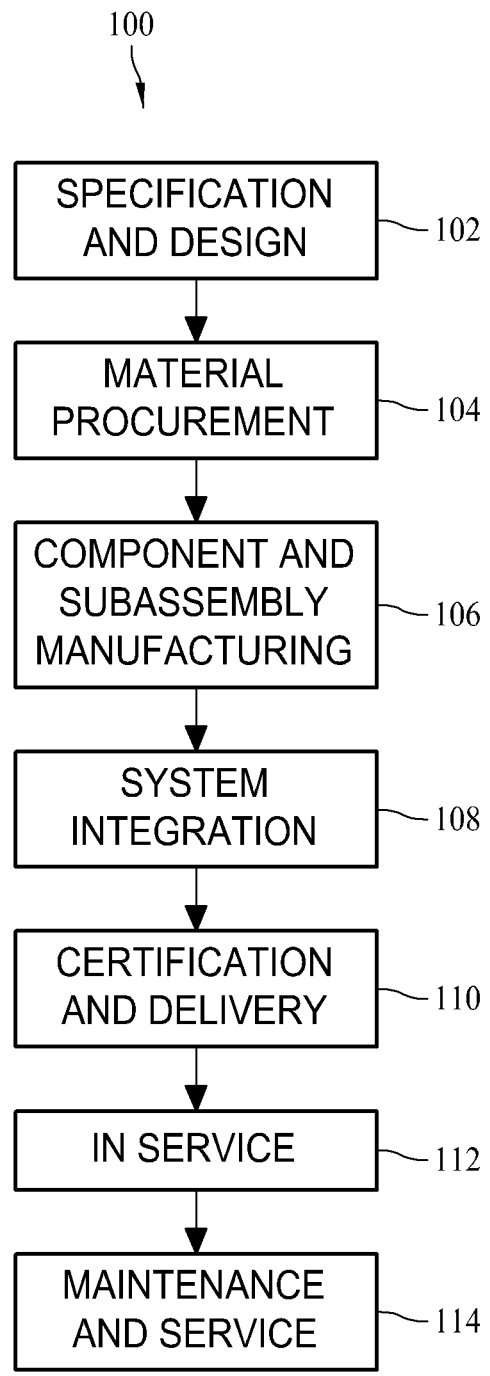
FIG. 1 is a flow diagram of an aircraft production and service methodology.
Figure 2:
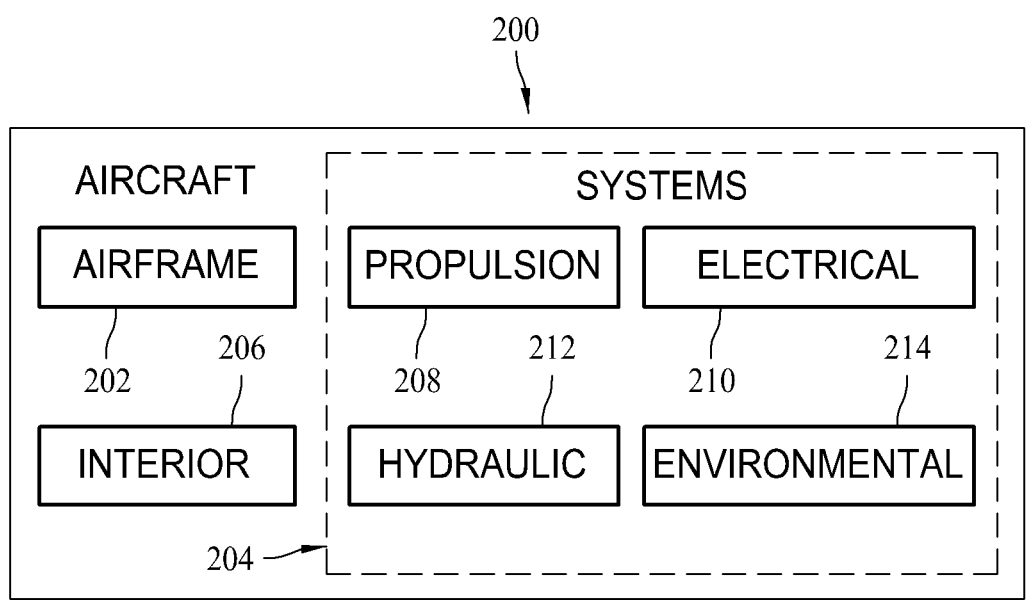
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft part identification and serialization 200 and specialized material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and systems integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments will be presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
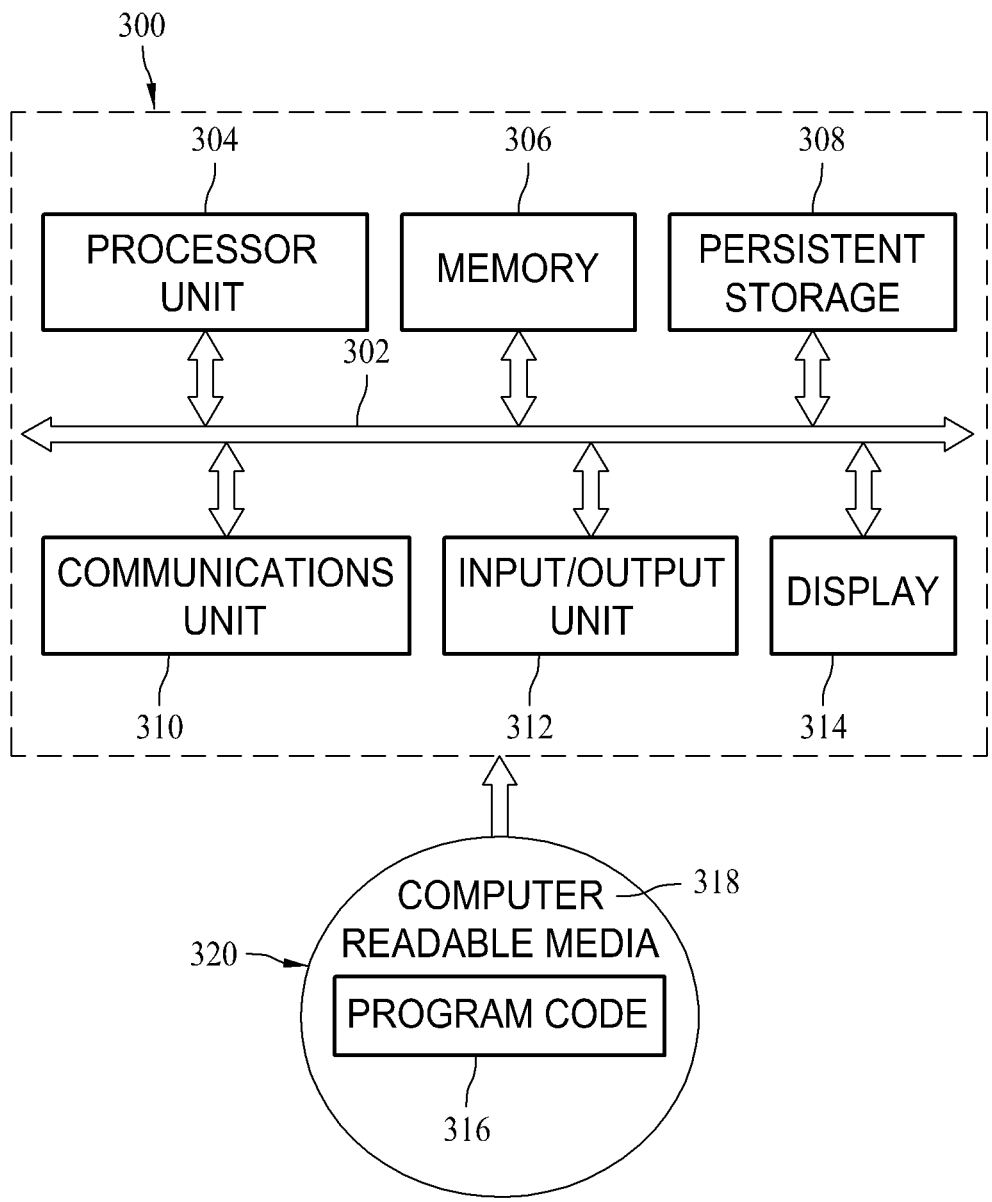
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is presents with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices, such as other disparate AIT systems. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on computer readable media such as persistent storage 308. These instructions may be loaded into memory 306 for execution by processor unit 304. The processes of the different embodiments may be performed by processor unit 304 using computer implemented instructions, which may be located in a computer readable media, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples.

In some illustrative embodiments, the memory 318 may be physically located in a separate computing device such that program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
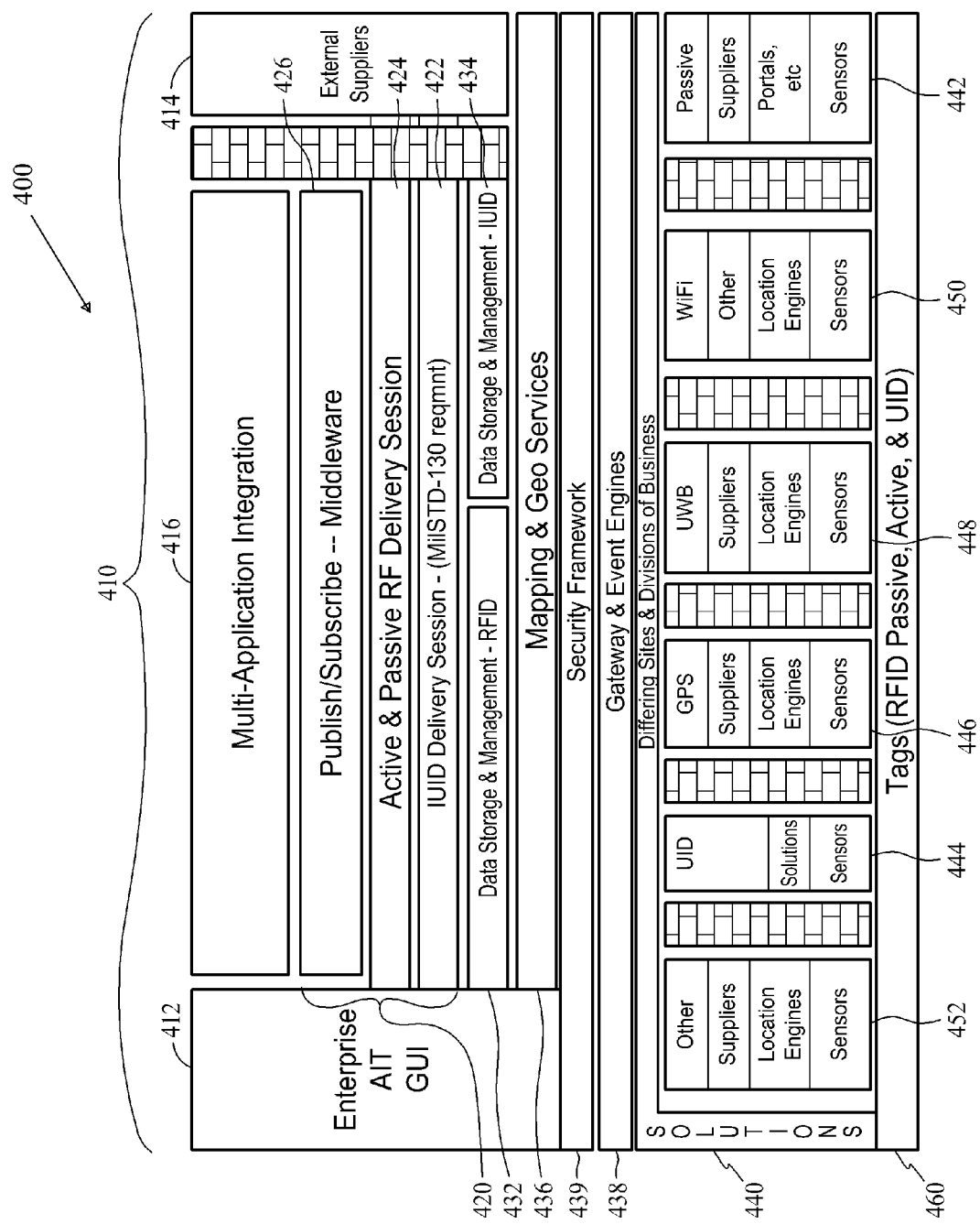
FIG. 4 is an illustration of an automated identification technologies target system architecture.

FIG. 4 is an illustration of an AIT target system architecture 400 for an AIT information management system (AITIMS). The AITIMS is implemented on one or more networked computers and operates to decouple the layers of a RFID/UID solution so the lower level infrastructure components can be replaced and/or upgraded as desired, for example, due to failed sensor components, technology progressions, a change in suppliers, and lower cost products. The AITIMS provides a foundational platform interface so that different types of automated identification technology (AIT) systems and solutions within a business can inter-operate in a seamless manner. The framework of AITIMS provides the integrated logic that enables a common data structure, a multi-level data security access component, data and map association capabilities within distributed environments, and the ability to securely access and transmit AIT data with external corporations and business venture partners through a common environment.

The AITIMS as described herein manages automated identification technology data. This data is transferred from the sensors or tags to the readers and location engines and then processed through a gateway event management engine. Such meta information is then associated with each referenced item or tag for a common framework identification process.

In the illustrated embodiment, the system architecture 400 for the AITIMS divides the below described components into logical layers to produce a solution which is maintainable, extensible and promotes lower level solution flexibility, replication, and reuse. The underlying components of the AITIMS solution are loosely coupled and act as part of the complete integrated solution. As a result, AITIMS is a fully integrated architecture solution, where internal components communicate through messaging protocols in gateway/event management and service layers. The inner-layer requests are governed by the messaging protocol as system service contracts. As further described, the core architecture contains all the functional component features for the management, control, and distribution of AIT information and data. Each tier is focused on providing a specific type of functionality to the delivered requirement. The key principles of this architecture are the collection and management of the data, the business system logic, and the robustness of the user interface.

The AITIMS is designed into a framework that helps to drive a service-oriented architecture (SOA) information management environment. An access layer 410 includes three components, specifically, an inward facing graphical user interface 412, an outward facing component 414, and a multi-application integration service 416. In one embodiment, inward facing graphical user interface 412 is driven through a web-based portal and a series of web services. In an embodiment, outward facing component 414 consists of a GUI component that works through an external reverse proxy secure portal through a firewall, for example, for customer and supplier integration and use. The multi-application integration service 416 includes a common application programming interface (API) that allows for the AITIMS architecture model to be integrated into adjoining or adjacent computing applications and systems. In one embodiment, an outward facing component 414 that works to establish secure functionality for external suppliers and customers of a business. In another embodiment, a role-based security framework is implemented to provide security measures to all applicable internal and external AIT solutions.

A service layer 420 includes an integrated unique identification (IUID) delivery session layer 422, an active and passive radio frequency identification (RFID) delivery session layer 424, and a publish and subscribe middleware service layer 426. The integrated unique identification (IUID) delivery session layer 422 delivers and controls the unique identification components and activities internally and externally. The active and passive radio frequency identification (RFID) delivery session layer 424 delivers and controls the radio frequency identification components and activities internally and externally. The publish and subscribe middleware service layer 426 provides the functionality to allow system and application developers to configure, deploy, and issue queuing commands directly to the AITIMS infrastructure through the common middleware interface.

An integration layer 430 includes data storage and management at an enterprise level with hierarchical functionality for both data storage and management RFID layer 432 and data storage and management IUID layer 434. These data storage and management components act as the formal repository for the automated identification data elements and related files internally and externally. A mapping and geo services component layer 436 within the integration layer 430 distinctively recognizes specific assets associated with specific sites and acts as a spatial location service. The mapping and geo services component layer 436 also provides a synchronous mapping component for active or passive RFID services and systematic logic so that it operates seamlessly in a distributed environment. A gateway and event engines layer 438 and a security framework layer 439 work in a synchronous manner to provide the access to AIT information gathered from the sensors or tags at various sites. The security framework layer 439 ensures all access control risks are formally mitigated and prompts are set normally open to assure proper authorization. Location calculation functions are handled by the specific Location Engines of each specific solution as described in the following paragraph.

A solutions layer 440 may include a multitude of AIT solutions at either the enterprise or at the various sites of activities. The layer 440 may include some, or all, of the components that make up AIT solutions, including, for example, passive RFID solutions 442, UID solutions 444, GPS solutions 446, UWB solutions 448, Wi-Fi solutions 450, and other solutions 452 that may be utilized by an enterprise such as active RFID solutions. More specifically, solutions layer 440 contains all of the necessary components which may or may not involve location engines, portals, readers, receivers, antennas, scanners, and tag verifiers that are utilized to enable specific RFID or UID solutions to work successfully.

The core responsibility of the tags layer 460 is to provide a depiction for all of the RFID (active and passive) and UID tags that are commissioned or activated at relevant facilities and/or suppliers. The tags layer 460 acts as the commissioning gateway into the AITIMS architecture model.

AIT tags and sensor devices process a signal transmission either through an active or passive scanning process and provide the specific data elements to the readers that are a part of the solution framework (within the tags layer 460).

Figure 5:
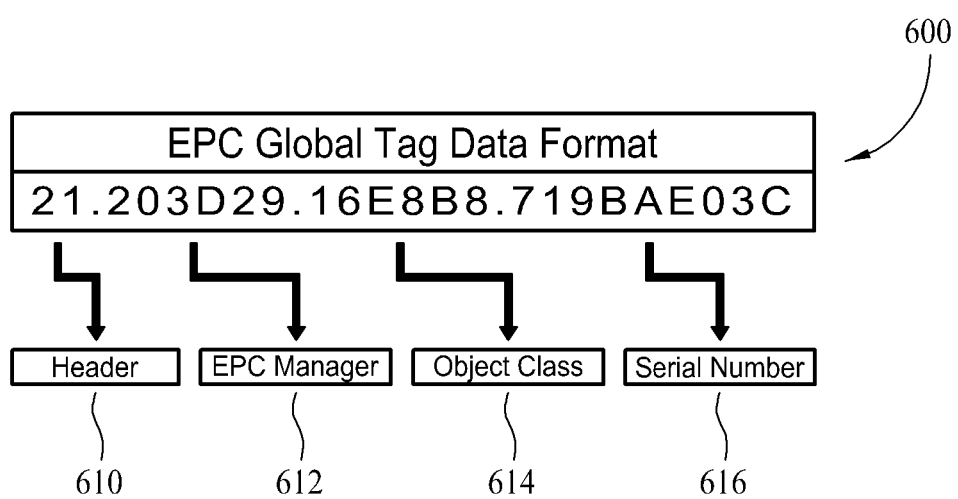
FIG. 5 is an example of a frame format for data received from a passive tag.

FIG. 5 is an example of a frame format 600 for data received from a passive RFID tag and includes a header 610, an EPC manager 612, an object class 614, and a serial number 616. One problem that the architecture described herein addresses is that there are no overarching standards that govern RFID tags and the related technology, for example, location engines, exciters, or readers. The AITIMS assigns its own identifiers and makes the tag information unique unto the information management system itself, thereby enabling all varieties of tags and tag technologies to be utilized, with the information flowing upwards through the components of the architecture, and allowing AITIMS to translate the data into meaningful information to differing sets of process customers. The frame format 600 is an example of an EPC Global Tags Format that provide meta-data and information that permits unique identification of tagged assets.

Figure 6:
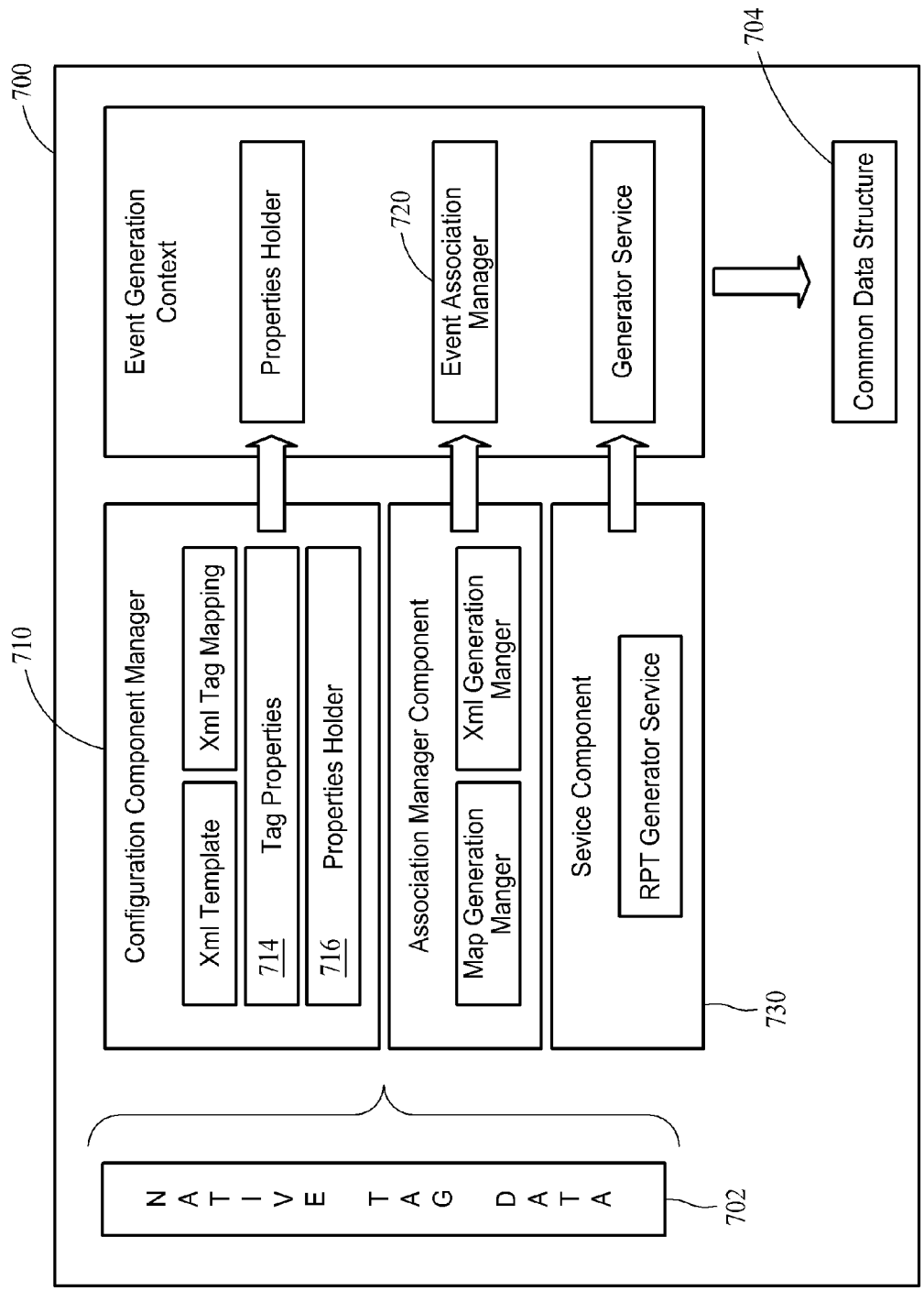
FIG. 6 is a model diagram of a gateway and event engines layer.

FIG. 6 is a model diagram 700 of the gateway and event engines layer 438 within the AITIMS that is responsible for transforming AITIMS data from native solution formats delivered from the solutions layer 440 to a common data structure format such as an Extensible Markup Language (XML) framework. The data conversion service is used by the core configuration component manager 710 and uses multiple object class information to provide the initial identification and position of the asset. The tag properties are then associated together by the properties holder for use by an event association manager 720. A generator service component 730 then provides the object model to establish the components for report and user viewing of the events as they are processed to a delivery session and the user interface as further described herein.

With regard to the security framework layer 439, security business objects are the business objects that implement specific security settings. The security business objects contain the logic and business rules on how and what data should be filtered based on predefined security settings. The security business objects also contain the logic to invoke filtering and optionally a rule engine to resolve complex security hierarchies for the data as needed. Access control for the AITIMS framework is designed so that all permissions are set to a normally open condition and thus initially restricting all users. Users are granted certain privileges and access controls are administered and opened up manually through an administrators control panel. When invoked, user profiles are set to control access to data, reports, and specific system content and functionality.

Figure 7:
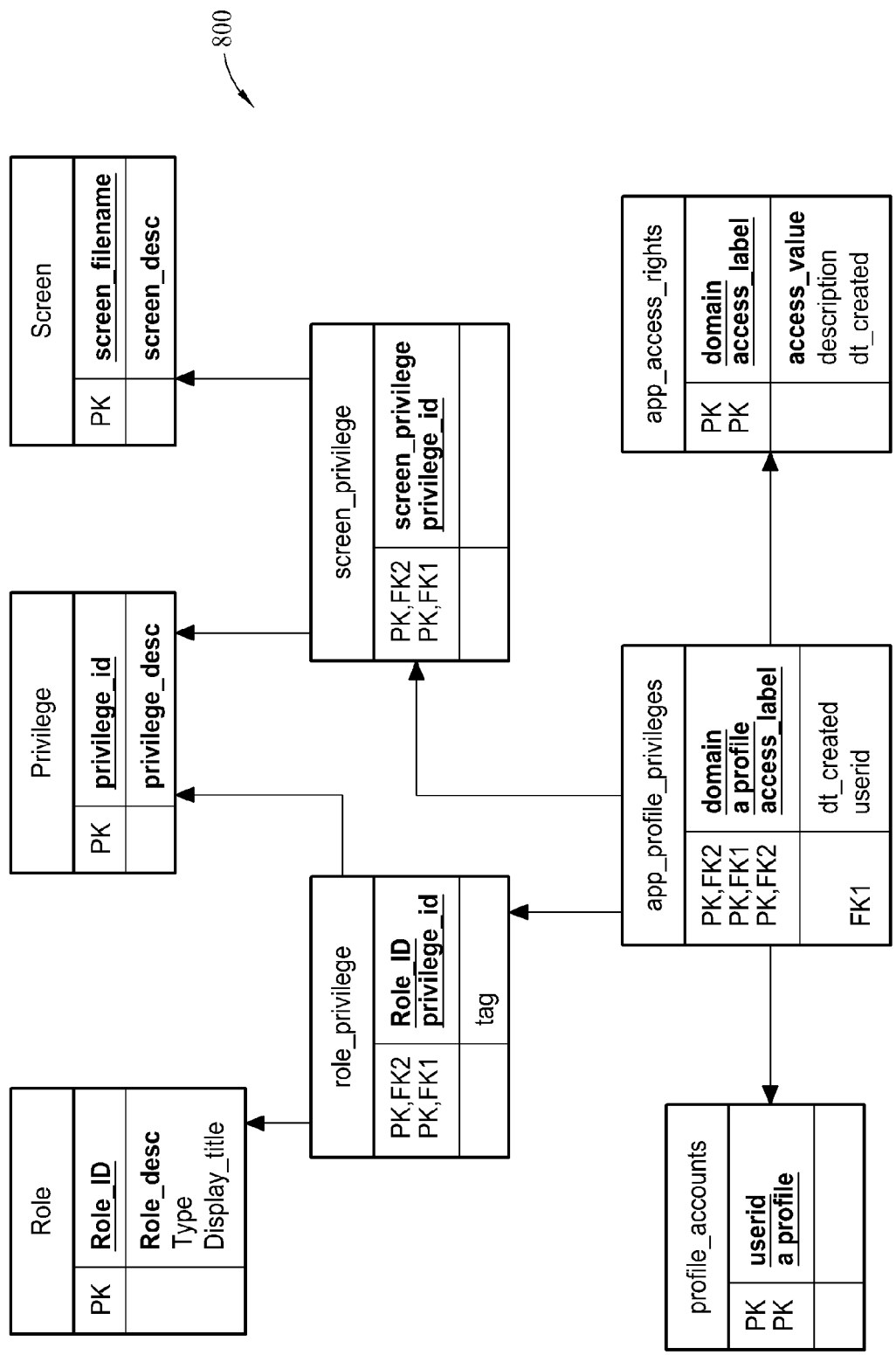
FIG. 7 is a representation of a data and system access security control model for an automated identification technologies information management system.

FIG. 7 is a representation of a data and system access security control model 800 for the AITIMS, illustrating both primary and secondary elements of security access and control. Such elements include role, privilege, screen, application access rights, and profile accounts, while secondary elements include role privileges, application profile privileges, and screen privileges.

Figure 8:
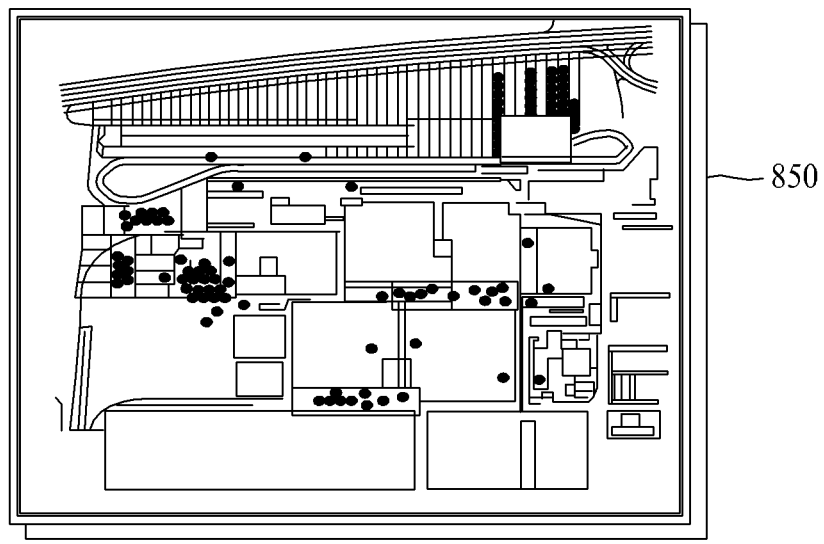
FIG. 8 is a diagram of a map that includes tag association.

Data inbound to the mapping and geo services layer 436 passes through data mapping during the gateway transformation process. A value from the source solution system in solutions layer 440 is associated to the value in AITIMS based on business logic for map and location associations. The mapping reference table is user manageable so a translation mapping component object model can be built up over time to handle not only initial event data, but ongoing data and events of an asset throughout its lifecycle. Data associated with all the deployed RFID and IUID tags incorporates a meta-information schema assigned by the gateways and event engine within gateways and event engine layer 438 for mapping and information association characteristics. FIG. 8 is a diagram of a map 800 with tag association.

Figure 9:
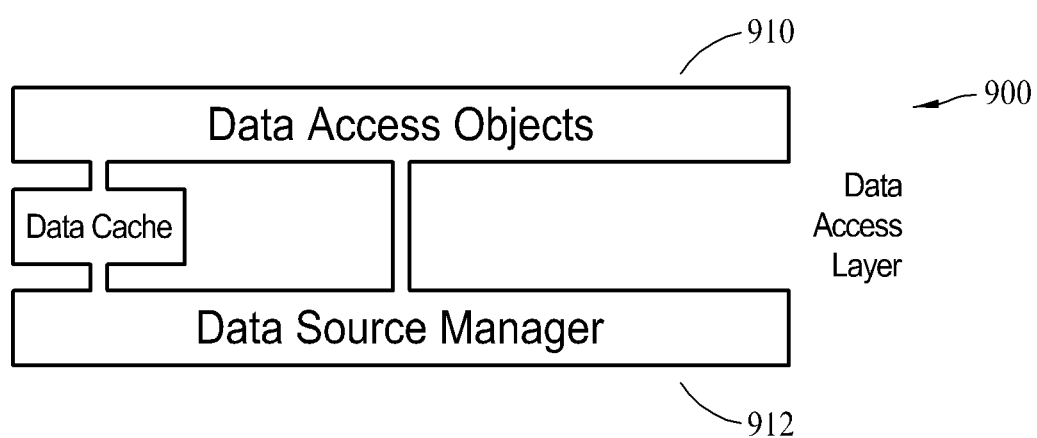
FIG. 9 is a depiction of a data access layer within a data storage and management layer.

Data storage and management (IUID & RFID) layers 432 and 434 include a data access layer 900, shown in FIG. 9 that serves three main purposes. First, the data access layer 900 accepts data access requests from the manager layer, which performs the necessary queries on the database and returns the data results in the form of domain objects back to the manager layer. Second, the data access layer is responsible for maintaining a mapping of domain object attributes to database table column, allowing the system to know which object attribute is populated with which database table field during a query operation. Lastly, the data access layer manages the connection to the actual data source itself.

The data access policy controller within the security framework layer 439 acts as a gate keeper between data returned from the UI controller and the solution business event objects. The data access policy controller also applies security criteria to the data based on its characteristics and requestor as well as filtering out the data restricted to the requestor and allows only the appropriate data to be routed into the appropriate business object associations. Since all other business functions are realized through business objects, data event leakage is prevented from the source. The data access tier contains the data access objects (DAO's) 910 that are used to execute queries into the database. The data access layer also manages the connection to the data source manager 912.

Mapping files as well as the configuration files are all part of the data access tier. The data access objects 910 mapped to the databases are generated by an object/relational management (ORM) framework. Using an ORM framework to generate the domain objects, the data access tier will lead to reduction in code and increased system performance. An out of the box open source ORM framework is able to implement certain optimizations like caching, outer join association fetching within the data model, and batching of updates/inserts/deletes to the database occur much more efficiently than typical handwritten JDBC. All application data that is related to AITIMS is stored in a relational database. The AITIMS database stores tag identification data and attachments in the database as a binary large object (BLOB) data type. In one embodiment, AITIMS includes a primary database, the on-line transaction process (OLTP)/main database, and two secondary databases, a reporting and event staging database and an integration or tag log files database. The secondary databases will service tag event management reports and integration function needs without impacting the solution system's ability to perform core functions such as event management and reporting.

Figure 10:
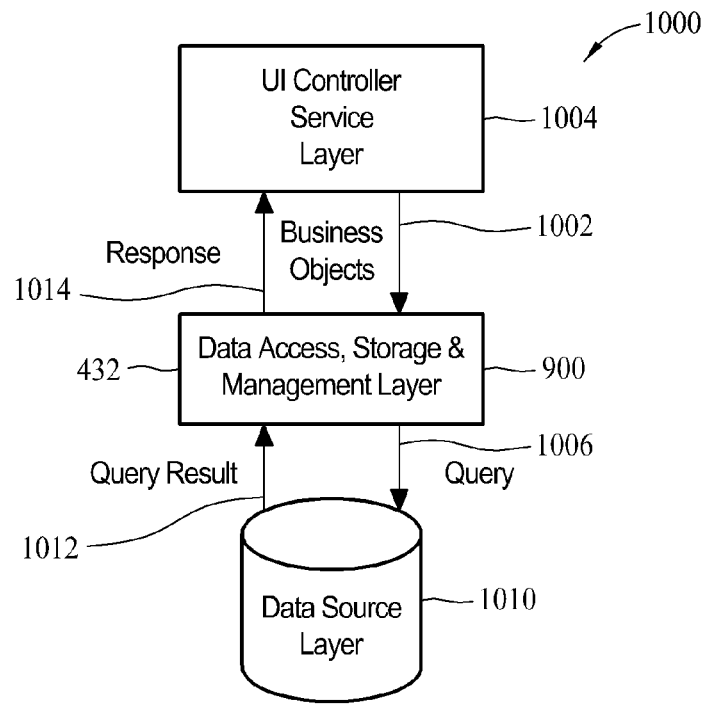
FIG. 10 illustrates data storage and management using a data access, control and storage model.

Data storage and management is further illustrated by the data access, control and storage model 1000 of FIG. 10. Business objects 1002 from the UI controller service layer 1004 are provided to the data access layer 900, and formatted therein as a query 1006 to a data source layer 1010. Query results 1012 from the data source layer 1010 are passed to the data access layer 900 for formatting as a response 1014 that is then forwarded to the UI controller service layer 1004 for eventual output at a user interface.

The AITIMS Graphical User Interface (GUI) Layer serves three main purposes. The first purpose is to display data and information in a user friendly format. Secondly, the UI layer provides facilities for the user to navigate around within the components of the architecture and AIT solutions. Lastly, the UI layer provides users a rich experience interacting with the solution. The output of the UI layer is both the physical HTML pages that are displayed in the user's web browser as well as the objects that are sent from the Service layer that contains updates to data within the system. A GUI serving the functions described herein is implied, however the design of that GUI is left to the programmer.

Figure 11:
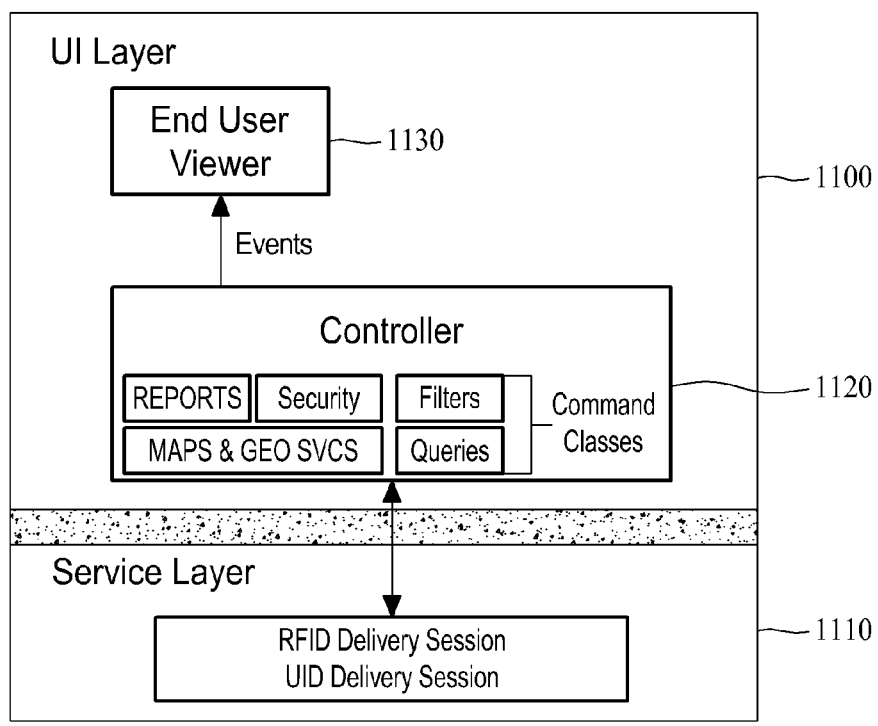
FIG. 11 illustrates interaction between a user interface layer and a service layer within an automated identification technologies information management system.

Referring to FIG. 11, a UI controller layer 1100 receives its input from a service layer 1110 which passes up data in the form of domain objects. The communication between the UI controller layer 1100 and the service layer 1110 is managed by a live cycle data services (LCDS) controller 1120. Coming into the UI controller layer 1100, the LCDS controller 1120 converts system domain objects to a data object that is known by the UI controller layer 1100. Coming out of the UI controller layer 1100, the LCDS controller 1120 converts command objects to a domain object that is recognized by the service layer 1110 through association.

The UI controller layer 1100 is organized into a model-view-controller based architecture. The framework is used within the user interface to facilitate data synchronization between the client and the server, while keeping the programming of the view layer detached from the event management layer. A set of reusable UI components (or UI controls) are constructed for viewing by a user via end user viewer 1130. The set of UI controls contains built-in universal mechanisms for security, layout, style (or skinning), data source, lifecycle, logging, marshalling and inter-control tag communication, with a disciplined set of interfaces, attributes and events that can be reused on AITIMS pages. The main function is that the UI controls containing AITIMS system logic are reused by module UIs for AIT Solution functions. In one embodiment, the AITIMS user interface is constructed on top of an Adobe Flex framework. Flex is a development and deployment framework for cross-platform rich Internet applications based on Adobe Flash.

The platform supports module UI objects built with the macromedia format of the XML framework (.mxml) files, and rendering of the UI following the XML syntax and in real time Interactivity will be achieved through the use of language frameworks such as ActionScript, which is the core language of Flash Player. The main function of this UI framework is to provide basic UI functions without having specific logic hardcoded into the UI.Input: additional UI definition and system logic from UI components. Output: basic framework level and UI component controls, passing data and user instruction to lower system solution layers. The role of the UI View processor in the AITIMS architecture is to define events and bind them to data stored in the service layer model. Components on the UI view can bind to higher Value Objects or other properties in the Model (data) & solutions layer for further association of asset identity and tracking.

In one embodiment, the UI controller layer 1120 is implemented as a single session front controller. The front controller instance, which receives every view-generated event, dispatches the events to the assigned command class based on the event's declared type, either RFID or IUID from the service layer of activities. The command class then processes the event by running the command class' execute( ) method. The execute( ) method will be able to update the central control model, as well as invoke a service layer class which typically involves communication with the data stores and or event manager.

Within the IUID and RFID delivery session layers 424 and 422, requests are made to the data access layers 423 and 434 by the UI controller service layer 1004. The data access class performs the necessary UID and/or RFID database operation and returns the results back to the UI controller service layer 1004 in the form of domain objects. The reporting component of the delivery session interfaces with the GUI and includes modules responsible for generating, displaying and exporting available reports in AITIMS.

Figure 12:
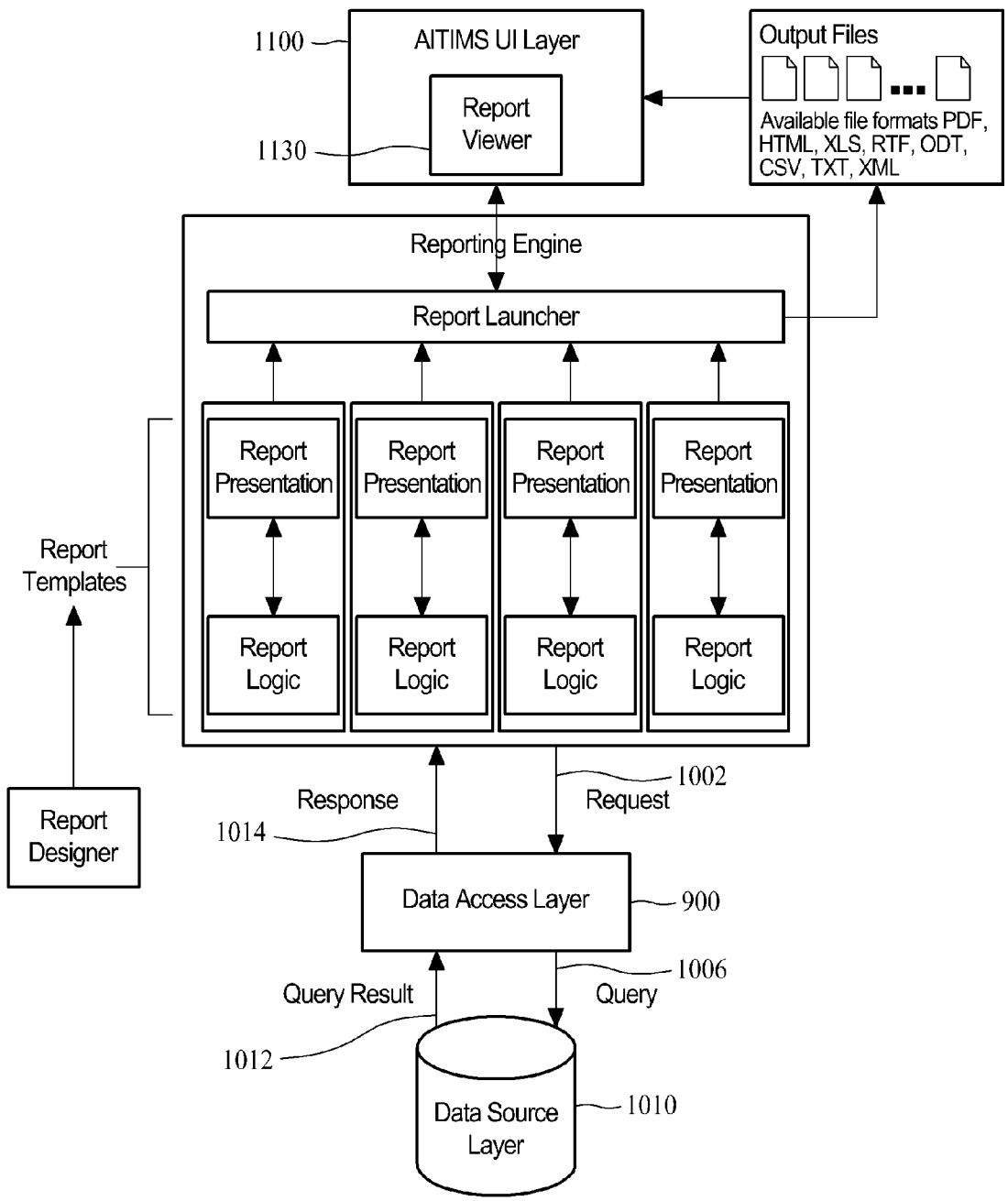
FIG. 12 illustrates generation of multiple report types within an automated identification technologies information management system.

Referring to FIG. 12, there are multiple report types within AITIMS. One report includes data on the transactional level, which displays AITIMS documents and records details, such as a report on a list of released assets for a specific user. The other reports aggregate data derived from transactional records, which includes data metrics such as logistics management throughout a period of time based on quantitative formulas with multiple factors. In addition, the aggregated data reports often contain functionalities for drill-down/drill up analysis. The AITIMS reporting architecture includes multiple solutions to provide support for multiple types of reports, as shown in the report generator model in FIG. 12.

Figure 13:
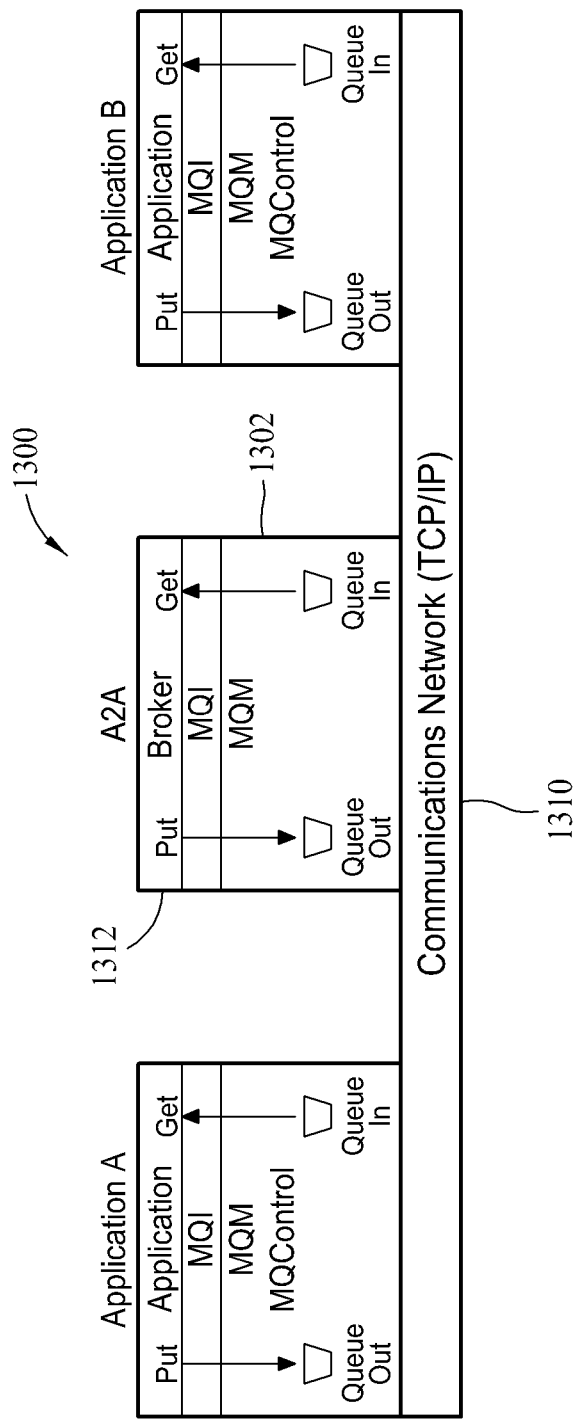
FIG. 13 illustrates that selection of middleware is independent of automated identification technologies information management system architecture.

As shown in FIG. 13, selection of middleware is independent of the AITIMS solution architecture. Data element queue adapters 1302 are deployed into AITIMS middleware servers 1300 to bring the event data from the source solution data management systems to AITIMS and vise-versa. For AITIMS data integration, the middleware data adapters will perform no data transformations or associations, as these are performed at the event management layer. FIG. 13 defines the inner workings of the queuing mechanism for the internal application 1310 to application (A2A) message broker 1312 for the middleware component 1300.

The multiple application integration component of AITIMS is a robust application programming interface (API) module which provides the capability for interfacing the AITIMS with external systems. These components include data adapters for scenarios where integration between AITIMS and an external system occurs using direct access and web services for scenarios where integration between AITIMS and an external system occurs using a standard web service design by approach. Wherever applicable, the integration component will reuse all the tiers of the core architecture except for the UI or the presentation tier.

In one embodiment, AITIMS implements HTTP/HTTPS and XML Transmit over a simple object access protocol (SOAP). The principle data interchange format is XML and Multipurpose Internet Mail Extensions (MIME) for tag event management in distributed environments.

In one embodiment, the AITIMS architecture introduces hot backup sessions for all the event data. The replication to the session database from the event database provides one copy of the transaction database. A redundant Oracle server instance will provide backup to the production databases. Application servers and database servers are clustered to provide a seamless failover in the production environment. The pre-production environment is the replication of the production environment including code and data and is also used as the stand-by failover server in catastrophic events.

An exception handling framework provides a mechanism for exception handling within the AITIMS architecture, in one embodiment, by defining an exception class hierarchy and delegates to support the development of new exceptions and propagation of exceptions. The Java language specification defines two types of exceptions, an exception and a runtime exception. Within the AITIMS framework, these are handled differently by the architecture framework, in that the former is called as the checked exception and the latter is considered a runtime exception. The checked exceptions are related to functional processing exceptions, and have to be explicitly propagated whereas the runtime exceptions are related to internal system and fatal exceptions, and are propagated up the stack. The exception handling framework provides two types of exceptions in the form of base exception and base runtime exception which are derived from exception and runtime exception respectively and the IExceptionable interface. Logging provides the user, developers or the administrator with detailed context for application/event failures at the server level. Using a logger hierarchy supported by standard open source logging frameworks the logging service in AITIMS controls which log statements are output and at what granularity, helping to reduce the volume of logged output and minimize the cost of logging for the application. AITIMS logs all exceptions to log files. If an exception is suppressed for any reason, a message will be sent to the administrator of the system and the event manager of the tags.

A transaction history provides a secondary logging at the tag data level. The purpose of the transaction history is to keep track of who changed what, and when it was changed. AITIMS implements a server side solution to provide universal transaction event history tracking, using shadow tables for each data table. Transaction history is tracked for all tables that can be updated through the AITIMS User Interface. Transaction history contains two parts: the type of update (INSERT, UPDATE, DELETE), and the specific event data for the update. The shadow table is used as a stack that keeps track of the tag updates. The record in the shadow table is generally one step behind the record of the original table.

The following provides several table update scenarios:
INSERT—Commission
Insert record into original table
Insert record into shadow table
UPDATE—Tag status
Update record into original table
Insert record into shadow table containing updated record
DELETE—De-Commission
Update record in original table with deletion date (delete flag)
Insert record into shadow table containing the record that was marked as deleted.

The transaction history table contains all fields of the original table with the addition of an additional column for "Action". Action stores the type of update. All original transaction tables will contain the following common fields: PK, Tag Data Fields, Asset Identification, Creation Date, Deleted by, Deletion Date, and Operation (INSERT, UPDATE, DELETE). From the implementation perspective, populating the transaction history tables will be done through the Base DAO. Transaction history will be applicable to all tables that are modified through the application. Tables that are modified directly through the database will not affect tag data transaction history.

Each document has a page for transaction history. On this page, the user will be able to view the transaction history of that particular asset. This includes the transaction history of all its parent/child record of events. Transaction history tables are named: Z_<table name>, which defines the transaction history for a particular event and is consistent between all modules. A template is re-used between modules. An additional field to the AITIMS domain base object contains the business operation field for the transaction history. Each module that utilizes this field automatically computes this value.

Event management tools are provided within AITIMS for complete monitoring capabilities for the administrators and end users. Through the error handling and logging, plus the messaging protocol in the service layer, the system captures all levels of event information and provides information transparency on the health of the system. These messages are persisted into the database and can be used to inform the user of the system status from all levels. The data can be used in dashboard displays or reports, with appropriate security controls and grouping for analysis.

The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein. Storage devices include one or more of a hard drive, a solid state memory device, and/or an optical disk that is operable to store data, such as computer-executable instructions.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. One or more computer-readable storage media having computer-executable instructions embodied thereon, wherein when executed by at least one processor, the computer-executable instructions cause the at least one processor to:

generate a gateway for at least one of read and write access to deployed identification sensors and tags associated with a set of assets, the sensors and tags incorporating a plurality of disparate native solution formats;

provide data storage and management with hierarchical functionality in a common data format for information passing through the generated gateway, the information related to the assets as provided by the deployed identification sensors and tags;

execute a service framework for data delivery to and from the deployed sensors and tags via a publish and subscribe middleware service layer that provides access to the gateway through a common middleware interface; and provide a user interface through which commands to the common middleware interface are generated.

2. One or more computer-readable storage media according to claim 1 wherein the deployed sensors and tags comprise one or more of active RFID tags, passive RFID tags, unique identification tags, GPS-based identification components, ultra-wideband-based (UWB) identification components, and Wi-Fi-based identification components.

3. One or more computer-readable storage media according to claim 1 further comprising computer-executable instructions that cause the at least one processor to:

perform spatial location for a set of the assets based on data in the common data format passing through the gateway; and provide a user interface including one of more of a geographic map and a location map illustrating a location of members of the set of assets.

4. One or more computer-readable storage media according to claim 1 wherein to perform spatial location for a set of the assets, the computer-executable instructions cause the at least one processor to provide, on the user interface, a location and a time at which a presence of the individual assets were detected through interrogation of the deployed sensor or tag associated with the respective asset.

5. One or more computer-readable storage media according to claim 1 wherein to execute a service framework for data delivery to and from the deployed sensors and tags, said media further comprises computer-executable instructions that cause the at least one processor to:

create an integrated unique identification (IUID) delivery session layer for delivery and control of components associated with unique identification devices; and create an active and passive radio frequency identification (RFID) delivery session layer for delivery and control of components associated with active and passive RFID devices.

6. One or more computer-readable storage media according to claim 1 wherein to provide a user interface, said media further comprises computer-executable instructions that cause the at least one processor to:

a first graphical user interface driven through a web-based portal and a series of web services; and a second graphical user interface including a GUI component that works through an external reverse proxy secure portal through a firewall.

7. One or more computer-readable storage media according to claim 1 further comprising computer-executable instructions that cause the at least one processor to transform data received in a native solution format to the common data format within an Extensible Markup Language (XML) framework.

8. One or more computer-readable storage media according to claim 1 further comprising computer-executable instructions that cause the at least one processor to:

use multiple object class information to provide an initial identification and position of a physical asset associated with an identification device;

associate identification component properties together for use by an event association manager; and provide an object model to establish identification components for report and user viewing of the events.

9. One or more computer-readable storage media according to claim 1 further comprising computer-executable instructions that cause the at least one processor to use security business objects implementing specific security settings within the logic and business rules therein to filter data based on the specific security settings.

10. One or more computer-readable storage media according to claim 1 further comprising computer-executable instructions that cause the at least one processor to implement a data policy controller function that applies security criteria to data to:

filter out the portion of the data restricted to a requestor of the data; and allow only appropriate data to be routed into business object associations.

11. One or more computer-readable storage media according to claim 1 further comprising computer-executable instructions that cause the at least one processor to implement a transaction history function at the tag data level.

12. One or more computer-readable storage media according to claim 1 further comprising computer-executable instructions that cause the at least one processor to:

accept data access requests, perform queries on a database in response to a data access request, and return data access results in the form of domain objects;

maintain a mapping of domain object attributes to a database table column; and manage connections to data sources.

13. A computer-based method for management, control, and distribution of automated identification technology (AIT) information and data associated with sensors and tags utilized for asset identification and tracking, said method comprising:

generating, using a processing device, a gateway for at least one of read and write access to deployed sensors and tags associated with a set of assets, the sensors and tags incorporating a plurality of disparate native solution formats;

providing data storage and management with hierarchical functionality in a common data format for information passing through the generated gateway, the information related to the assets as provided by the deployed identification sensors and tags;

executing a service framework for data delivery to and from the deployed sensors and tags via a publish and subscribe middleware service layer that provides access to the gateway through a common middleware interface; and providing a user interface through which commands relating to the access of the stored data and writing of data to the deployed sensors through the common middleware interface are generated.

14. The computer-based method according to claim 13 wherein the deployed sensors and tags comprise one or more of active RFID tags, passive RFID tags, unique identification tags, GPS-based identification components, ultra-wideband-based (UWB) identification components, and Wi-Fi-based identification components.

15. The computer-based method according to claim 13 further comprising:

performing spatial location for a set of the assets based on data in the common data format passing through the gateway; and providing a user interface including one of more of a geographic map and a location map illustrating a location of members of the set of assets.

16. The computer-based method according to claim 13 wherein performing spatial location for a set of the assets comprises providing, on the user interface, a location and a time at which a presence of the individual assets were detected through interrogation of the deployed sensor or tag associated with the respective asset.

17. The computer-based method according to claim 13 wherein executing a service framework for data delivery to and from the deployed sensors and tags further comprises:

creating an integrated unique identification (IUID) delivery session layer for delivery and control of components associated with unique identification devices; and creating an active and passive radio frequency identification (RFID) delivery session layer for delivery and control of components associated with active and passive RFID devices.

18. The computer-based method according to claim 13 wherein providing a user interface comprises:

providing a first graphical user interface driven through a web-based portal and a series of web services; and providing a second graphical user interface including a GUI component that works through an external reverse proxy secure portal through a firewall.

19. The computer-based method according to claim 13 further comprising transforming data received in a native solution format to a common data format within an Extensible Markup Language (XML) framework.

20. The computer-based method according to claim 13 further comprising:

using multiple object class information to provide an initial identification and position of a physical asset associated with an identification device;

associating identification component properties together for use by an event association manager; and providing an object model to establish identification components for report and user viewing of the events.

21. The computer-based method according to claim 13 further comprising:

accepting data access requests, performing queries on a database in response to data access requests, and returning data access results in the form of domain objects;

maintaining a mapping of domain object attributes to a database table column; and managing connections to data sources.

* * * * *